(12) United States Patent
Dang

(10) Patent No.: US 11,809,919 B2
(45) Date of Patent: Nov. 7, 2023

(54) CENTRAL EVENT CATALOG

(71) Applicant: SAP SE, Walldorf (DE)

(72) Inventor: Tung Dang, Wiesloch (DE)

(73) Assignee: SAP SE, Walldorf (DE)

( * ) Notice: Subject to any disclaimer, the term of this patent is extended or adjusted under 35 U.S.C. 154(b) by 245 days.

(21) Appl. No.: 17/245,449

(22) Filed: Apr. 30, 2021

(65) Prior Publication Data

US 2022/0350680 A1 Nov. 3, 2022

(51) Int. Cl.
*G06F 9/54* (2006.01)
*G06F 16/34* (2019.01)
*G06F 8/75* (2018.01)
*G06F 8/30* (2018.01)
*G06F 16/338* (2019.01)

(52) U.S. Cl.
CPC ............... *G06F 9/542* (2013.01); *G06F 8/30* (2013.01); *G06F 8/75* (2013.01); *G06F 16/338* (2019.01); *G06F 16/34* (2019.01)

(58) Field of Classification Search
None
See application file for complete search history.

(56) References Cited

U.S. PATENT DOCUMENTS

| | | | |
|---|---|---|---|
| 6,275,957 B1 * | 8/2001 | Novik ............... | G06F 16/24568 714/39 |
| 6,289,395 B1 * | 9/2001 | Apte .................. | G06F 8/24 719/318 |
| 6,625,804 B1 * | 9/2003 | Ringseth ............ | G06F 9/542 719/310 |
| 6,772,408 B1 * | 8/2004 | Velonis ............... | G06F 9/542 717/109 |
| 7,559,065 B1 * | 7/2009 | Sosnovsky ......... | G06F 9/542 719/318 |
| 2007/0240166 A1 * | 10/2007 | Marappan ........... | G06F 9/54 719/318 |
| 2014/0229435 A1 * | 8/2014 | Palivatkel .......... | G06F 16/24552 707/620 |
| 2020/0177534 A1 * | 6/2020 | Kalmady ............ | H04L 51/00 |
| 2021/0256209 A1 * | 8/2021 | Rafey ................. | G06F 40/295 |

* cited by examiner

*Primary Examiner* — Jason D Mitchell
(74) *Attorney, Agent, or Firm* — Fountainhead Law Group P.C.

(57) ABSTRACT

In an event-driven architecture, at design time a central catalog allows event consumer(s) to reconstruct an event structure for later processing during runtime. The central event catalog receives from a publisher (of an event producer), an event description document specifying an event identifier, source code of an event class extracted from an event, and an annotation. This event description document is stored by the catalog as a central instance in a database. Upon receiving a query from an event consumer regarding the event, the event description document is returned as a query result. A code generator (of the event consumer) creates the event structure from the event description document, allowing processing of the event. Embodiments are particularly suited to centrally locate a single, up-to-date instance of an event description document, for reference in allowing multiple consumers of an event to accurately reproduce the latest version the structure of that event.

20 Claims, 12 Drawing Sheets

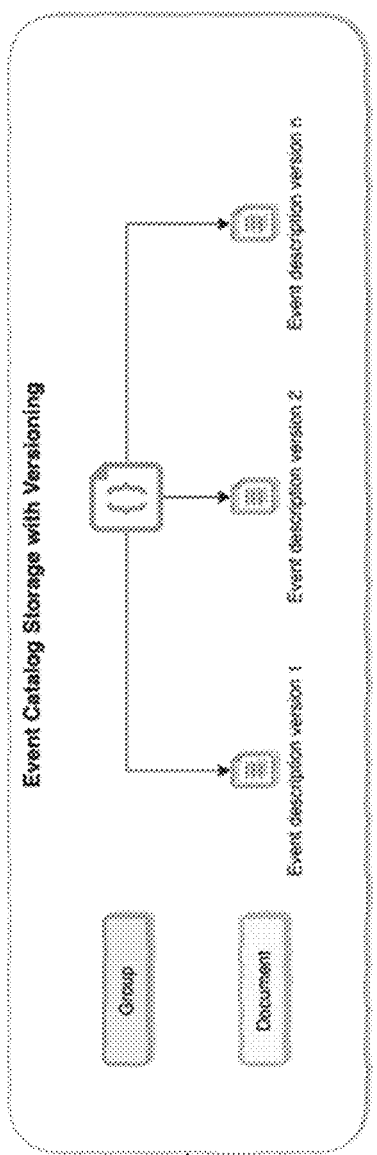
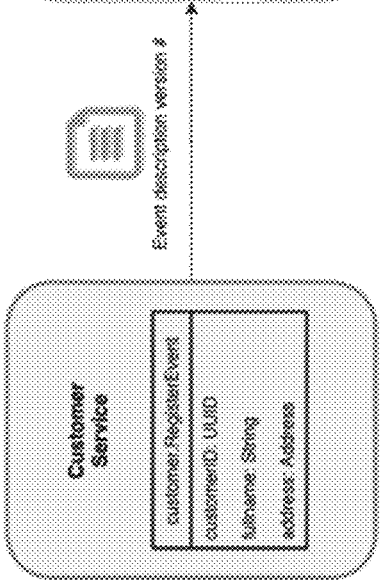
FIG. 9
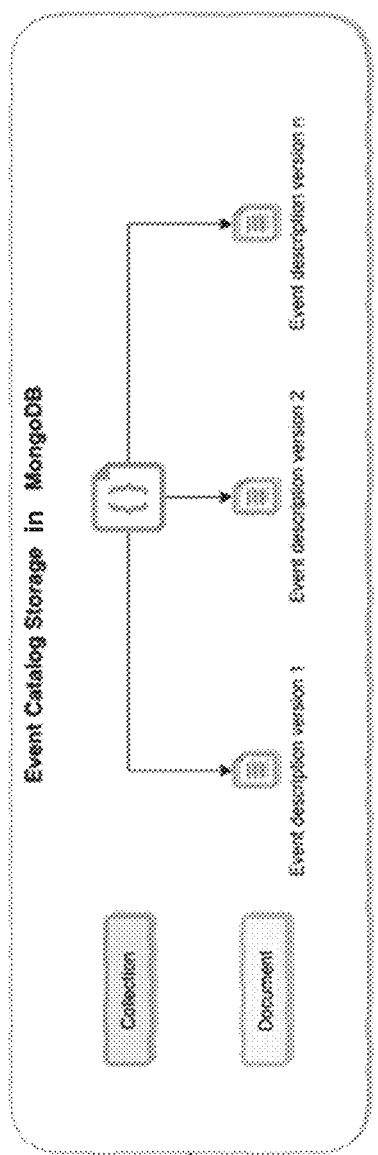
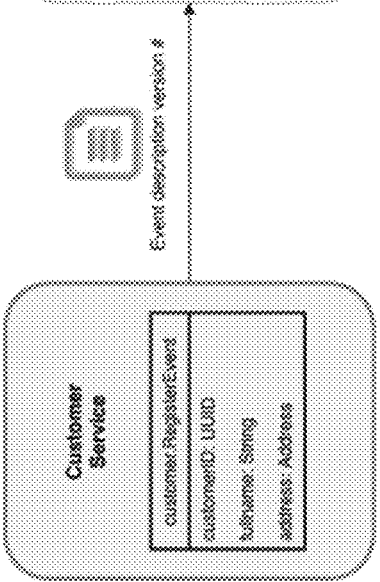
FIG. 10

FIG. 11

```
  _id: "com.sap.eventcatalog.event.OrderPlacedEvent_1"
  eventName: "com.sap.eventcatalog.event.OrderPlacedEvent"
  version: 1
  v fields: Array                                            1110
    v 0: Object
       accessModifier: "private"
       type: "java.util.UUID"              1112
       name: "eventID"         1114
       description: "Event Id."      1116
    v 1: Object
       accessModifier: "private"
       type: "java.util.UUID"
       name: "customerID"
       description: "Customer ID who places the order"
    v 2: Object
       accessModifier: "private"
       type: "java.util.UUID"
       name: "orderID"
       description: "Order ID"
    v 3: Object
       accessModifier: "private"
       type: "java.time.LocalDate"
       name: "orderDate"
       description: "The date where the order is successfully created in the system"
    v 4: Object
       accessModifier: "private"
       type: "java.lang.String"
       name: "orderStatus"
       description: "Current status of the order. Possible values: PLACED, CANCELLED, PAID,..."
  source:
       import com.sap.eventcatalog.annot...
       "package com.sap.eventcatalog.event;
       _class: "com.sap.eventcatalog.description.EventDescription"
```

1100
1102
1104
1106
1108

CENTRAL EVENT CATALOG

BACKGROUND

Unless otherwise indicated herein, the approaches described in this section are not prior art to the claims in this application and are not admitted to be prior art by inclusion in this section.

A (micro)service-based computer architecture divides up a single software application into a number of small, physically separated, and loosely-coupled autonomous services that work together. In order to achieve coordinated activity of such services, communication between them may be based upon broadcast events.

Specifically, an event producer publishes event(s) onto an event bus. An event consumer subscribes to receive and react to relevant events. In order to do this, the event consumer needs to know the structure of the event—as defined and made available by the event producer. However, maintaining accurate and up-to-date structures of many different events can pose a significant challenge to system designers.

SUMMARY

In an event-driven architecture, at design time a central catalog allows event consumer(s) to accurately reconstruct an event structure for later processing during runtime. The central event catalog receives from a publisher (of an event producer), an event description document specifying an event identifier, source code of an event class extracted from an event, and an annotation. This event description document is stored by the catalog as a central instance in a database. Upon receiving a query from an event consumer regarding the event, the event description document is returned as a query result. A code generator (of the event consumer) creates the event structure from the event description document, thereby allowing later processing of the event during runtime. Embodiments are particularly suited to centrally locate a single, up-to-date instance of an event description document (e.g., in MongoDB), allowing microservice consumer(s) to reproduce the latest version of an event structure (that will subsequently be executed at runtime).

The following detailed description and accompanying drawings provide a better understanding of the nature and advantages of various embodiments.

BRIEF DESCRIPTION OF THE DRAWINGS

FIG. 6A shows sample code of an exemplary event description publisher.

FIG. 6B shows a code snippet of an event class.

FIG. 9 is a simplified block diagram illustrating event description versioning.

FIG. 10 is a simplified block diagram illustrating the implementation of an event description in MongoDB.

FIG. 11 shows an exemplary event description document in MongoDB.

DETAILED DESCRIPTION

Described herein are methods and apparatuses that implement a central event catalog for an event-driven microservices software architecture. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
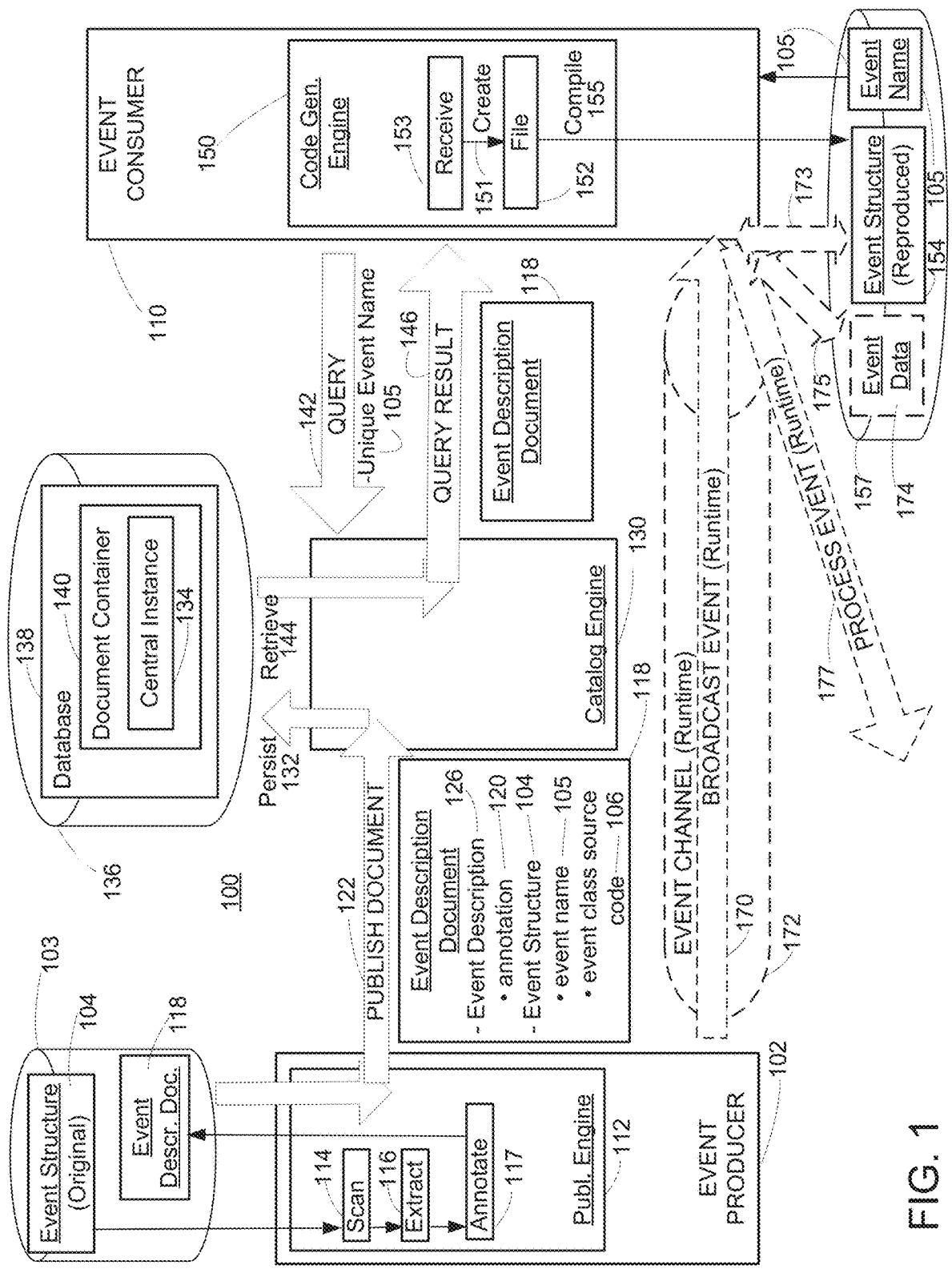
FIG. 1 shows a simplified diagram of a system according to an embodiment.

FIG. 1 shows a simplified view of an example design time system 100 that is configured to implement a central event catalog according to an embodiment. For ease of illustration, elements relevant to the design time implementation of a central event catalog, are shown in solid. Elements relevant to subsequent runtime processing of an event, are shown dashed.

Specifically, system 100 comprises an event producer 102 that is in communication with a non-transitory computer readable storage medium 103 that contains an original event structure 104. The original event structure includes a unique event name 105, and source code 106 including an event class.

At runtime, an event consumer 110 needs to receive and process the original event issued by the producer. However, the event consumer does not know the structure of the original event.

Accordingly embodiments provide the event producer with a publication engine 112. This engine scans 114 the original event structure, and extracts 116 the event class therefrom.

From the information extracted from the original event, the publication engine creates an event description document 118. In addition to the event structure, this event description document may further comprise annotations 120 that aid in cataloging of the event in the manner described below.

At design time, the publication engine publishes 122 the event description document which may include event structural elements 104 and accompanying description 126 of the original event. Details of an exemplary publisher component are further described below in connection with FIGS. 5 and 6.

The catalog engine 130 receives and recognizes the event description document. The catalog engine then persists 132 published event description document as a central instance 134 within non-transitory computer readable storage medium 136. This event description document can be stored, for example in a relational database 138 (e.g., optionally in a container 140 according to a document-based schema such as MongoDB).

At design time, the catalog engine allows querying of the persisted information based upon the unique event name. In response to receiving such a query 142 (e.g., from an event consumer 110) that includes the unique event name 105, the catalog engine can retrieve 144 event structure and description in the form of a relevant event description document, and return same as a query result 146.

In particular, a code generation engine 150 is located at the event consumer. At design time, the code generation engine receives 153 the event description document from the central instance. Details regarding an exemplary code generation component, are described later below in connection with FIG. 7.

From that retrieved source code, the code generation component will create 151 source code file(s) 152 for accurately reproducing a faithful copy 154 of the original event on the event consumer side, that is stored within non-transitory computer readable storage medium 157.

Being in possession of this accurate, up-to-date reproduced event structure, allows the event consumer to be ready to accurately process the event during runtime. In particular, the dashed elements of FIG. 1 show elements implicated during subsequent processing of the event at runtime.

Specifically, at runtime the event provider broadcasts 170 the event over an event channel 172 (such as an event bus). The broadcast event is received by the event consumer.

Then, the event consumer references 173 the reproduced event structure in order to accurately process 177 the event. This event processing may consume 175 event data 174 that is stored at the event consumer.

To summarize: implementing the central event catalog at design time, sets the stage at runtime for the event consumer to accurately process an event according the central instance.

Figure 2:
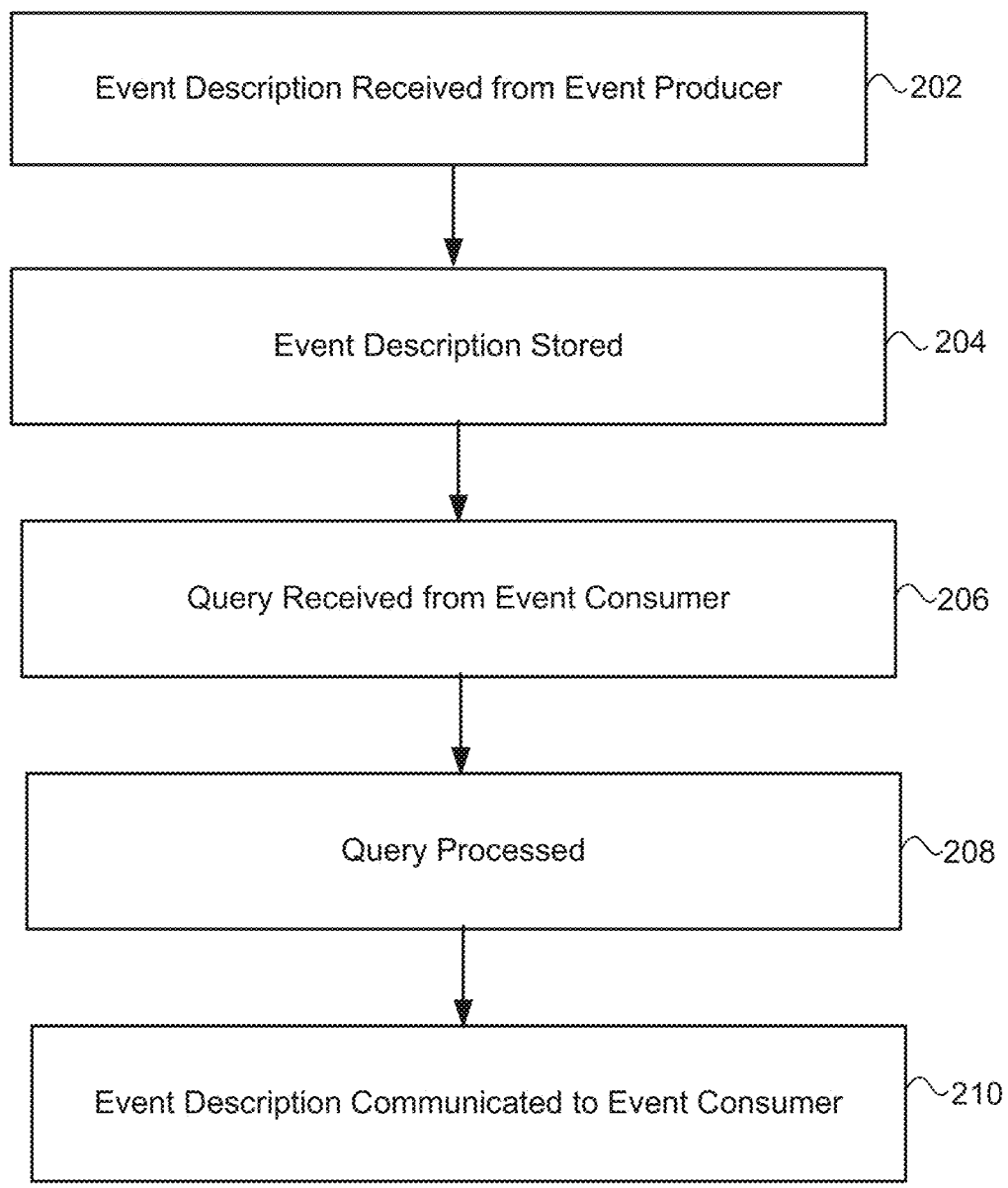
FIG. 2 shows a simplified flow diagram of a method according to an embodiment.

FIG. 2 is a flow diagram of a method 200 according to an embodiment. At 202, an event description document is received from an event producer.

At 204, the event description document is stored as a central instance. At 206, a query is received from an event consumer regarding the event.

At 208, the query is processed with reference to the database to return the event description document as a query result. At 210, the event description document is communicated to a code generator of the event consumer.

Systems and methods for implementing a central event catalog according to embodiments, may avoid one or more issues associated with conventional approaches. Specifically, embodiments avoid the error-prone and time-consuming effort of the event producer having to ensure that the correct event structure is updated every time an event is altered by publishing a new version of the event, so that potentially affected event consumers are made aware of the changes.

Embodiments may avoid errors for the event consumers as well, because the source code of the event structure will be automatically generated with the correct version of the event description.

Further details regarding implementation of a central event catalog according to various embodiments, are now provided in connection with the following example.

Example

Figure 3:
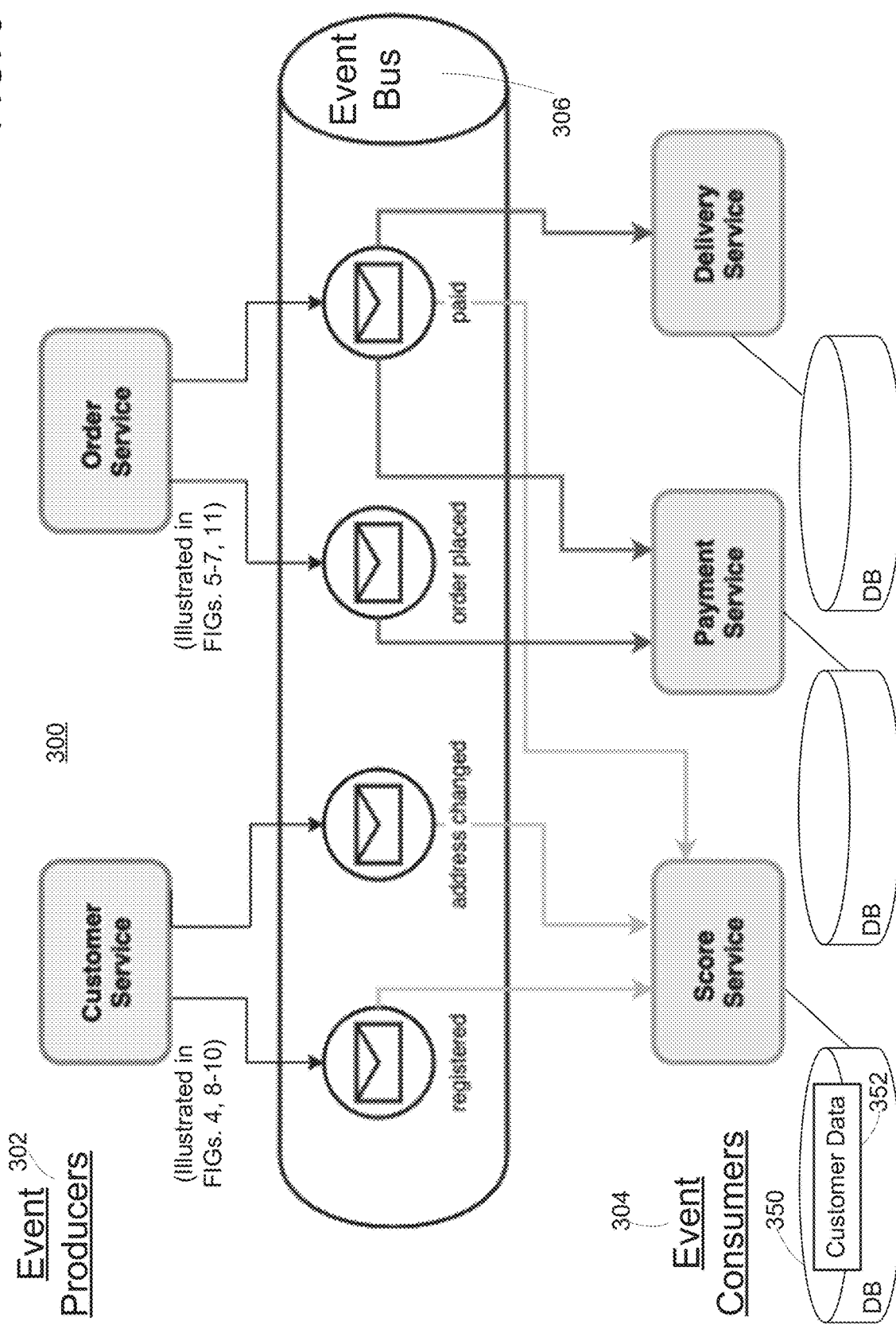
FIG. 3 shows a simplified block diagram illustrating an example of an event-driven microservices architecture at runtime.

FIG. 3 shows a simplified block diagram illustrating an example runtime of an event-driven (micro)services architecture 300. An event-driven application typically consists of event producers (emitters) 302, event consumers 304, and event channels—here shown as an event bus 306.

Event producers emit and publish events to event channels. Event consumers listen to event channels and may react/respond to relevant events.

Owing to the publish-subscribe structure of the event architecture, producers and consumers do not know of each other's existence. Thus, the event producers do not know about specific event consumers, and vice versa.

Additionally, event producers do not know if their published events are being used or further processed. Rather, the events are simply broadcast onto the event channel without necessarily receiving any response.

The particular event-driven architecture of FIG. 3 is an order management system comprising five different microservices. The Customer Service microservice and the Order Service microservice are event producers. The Customer Service is in charge of managing customers. The Order Service is responsible for managing orders.

The Customer Service broadcasts two events:
registered (indicating that a new customer has been created), and
address changed (indicating that the address of the customer has been changed).

The Order service (event producer) broadcasts two events:
order placed (indicating that a new order has been created), and
paid (indicating that the order has been fully paid).

The Score Service microservice, Payment Service microservice, and Delivery Service microservice are event consumers. The Score Service is used to calculate a customer's score for marketing purposes. The Payment Service takes care of payments. The Delivery Service is responsible for goods delivery and tracking delivery status.

As shown in FIG. 3, the Score Service receives the broadcast events:
registered,
address changed, and
paid.

The Score Service microservice is in communication with a database 350 that stores relevant (customer) data 352 for consumption by execution of the microservice at runtime. Once a new customer is registered, their name, ID, address etc. are stored in the database for future reference.

The Payment Service microservice receives the events:
order placed, and
paid.

The Delivery service receives the event:
paid.

Figure 4:
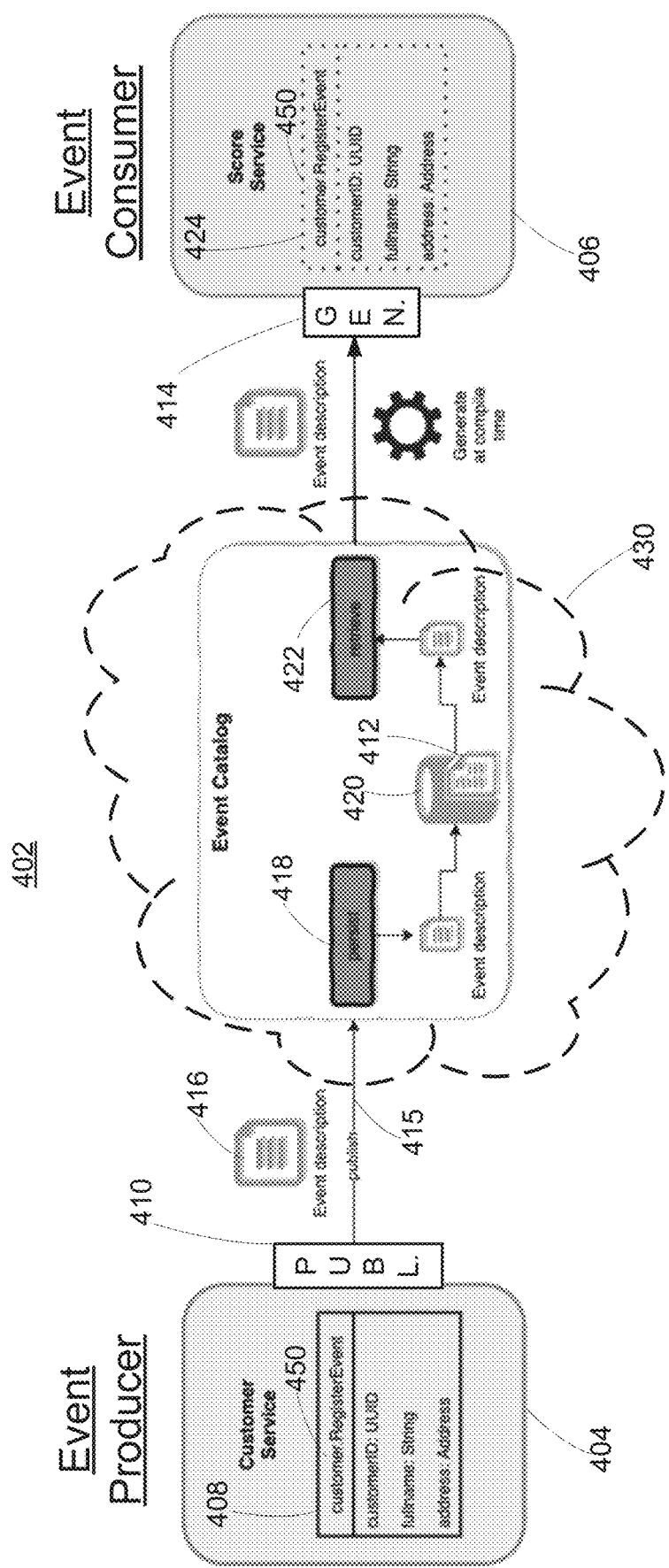
FIG. 4 is a simplified block diagram showing an exemplary system implementing a Central Event Catalog at design time according to an embodiment.

FIG. 4 is a simplified block diagram showing an exemplary system implementing a central event catalog 402 between a Customer Service 404 and a Score Service 406. Here, the sample original event is the new customer registration event 408 shown on the left hand side of FIG. 3. That customer registration event has the unique event name "Customer.RegisterEvent" 450.

The Central Event Catalog manages the structure and description of various events. The Central Event Catalog comprises at least three core components:
1) an event description publisher 410,
2) the central instance itself 412, and.
3) a code generation 414.

Further details regarding these individual core components of the Central Event Catalog, are now discussed.

The event description publisher will automatically scan all the event implementation classes. The event description publisher will publish 415 the structure and description of event as a document 416 to the central instance of the Event Catalog.

The central instance is mainly responsible for the persistence 418 of the published event structure and description within a non-transitory computer readable storage medium 420. It allows querying and retrieving 422 structure and description of events.

Based upon a query including the unique event name, the code generation will retrieve structure of the events from the central instance, and generate from that source code files for implementing faithful reproduction of event structure 424 on the event consumer side.

As shown in FIG. 4, the Central Event Catalog can (but is not required) to be deployed and run on the cloud 430. According to such embodiments, the Central Event Catalog can thus fit to a cloud native application architecture.

Figure 5:
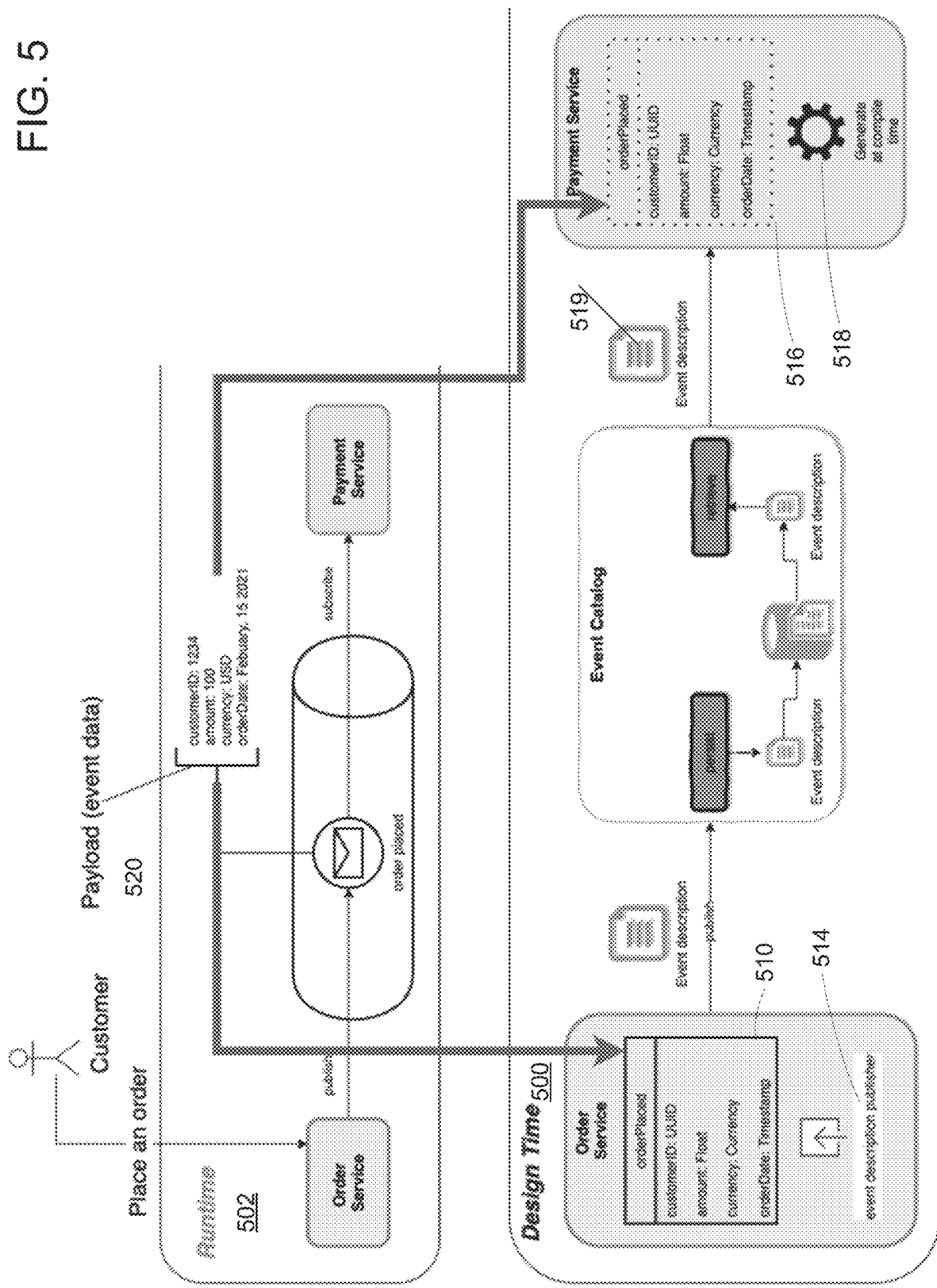
FIG. 5 is a simplified block diagram showing an exemplary system implementing a Central Event Catalog at design time according to another embodiment.
Figures 6A, 6B:
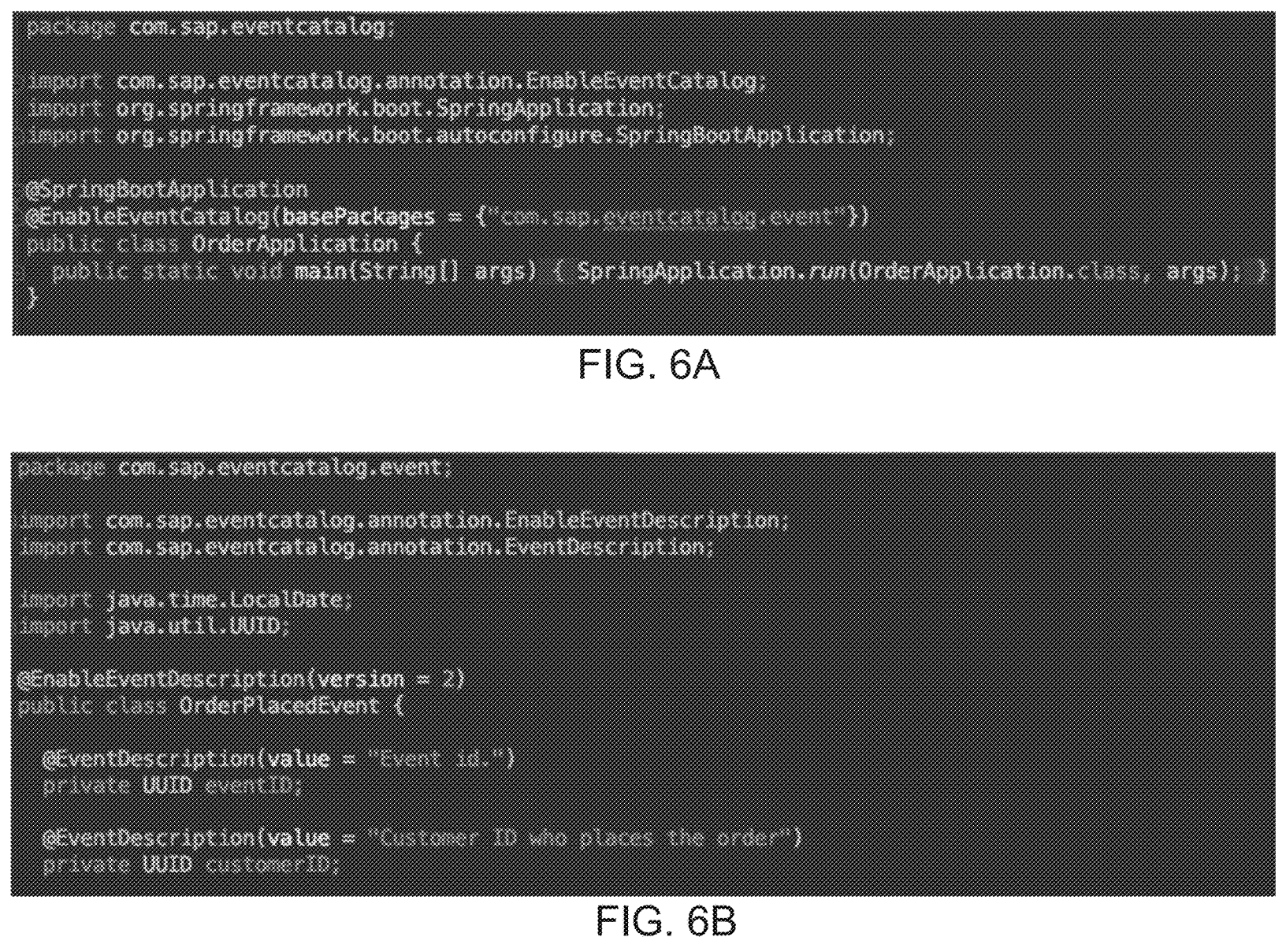
Figure 7:
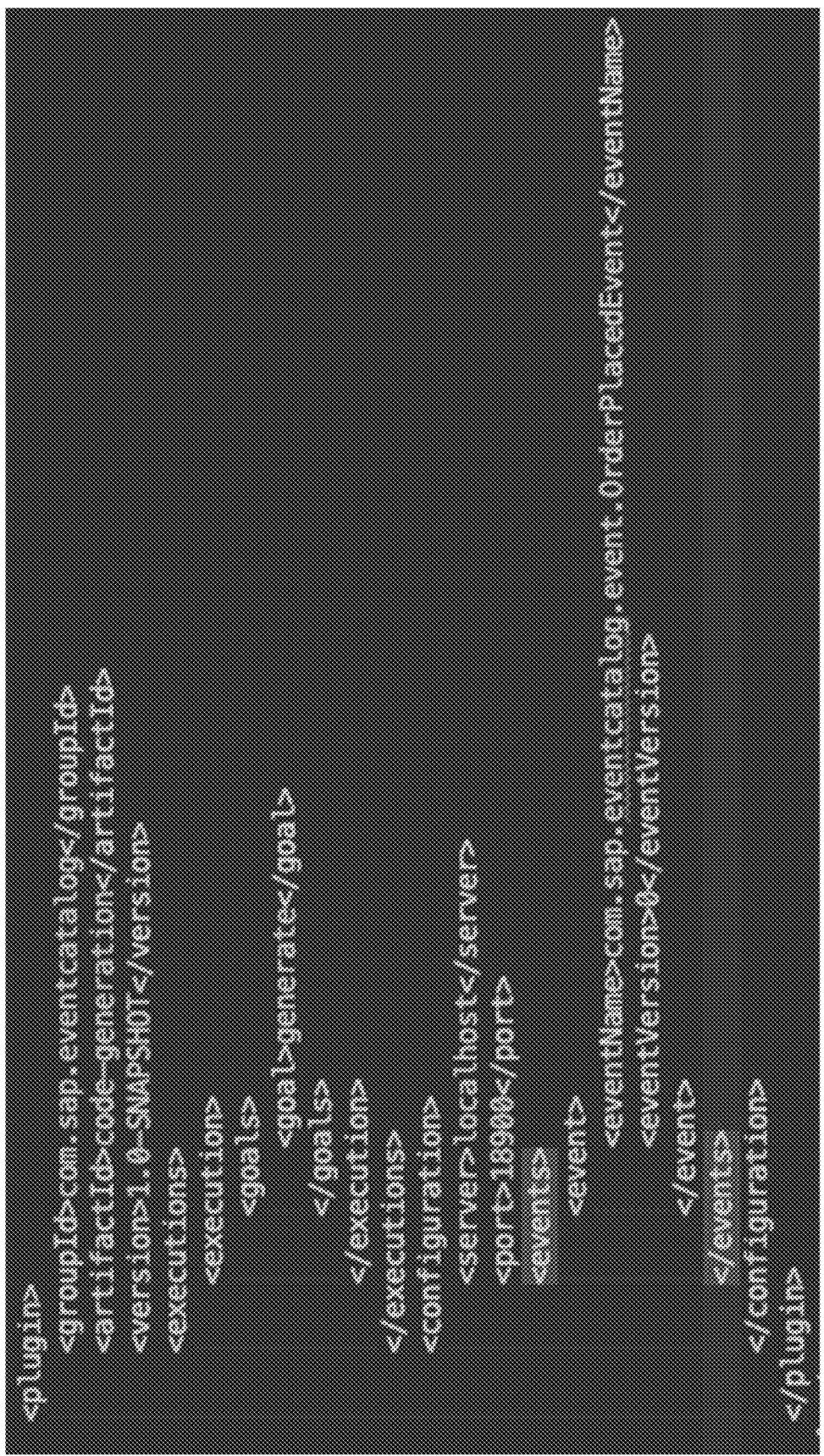
FIG. 7 shows an example of plugin code.

Further details regarding the event description publisher component are now provided in connection with FIGS. 5-7. These figures illustrate code for an original produced event orderPlaced, for the placement of an order (e.g., as communicated from the Order Service event producer to the Payment Service event consumer in FIG. 3).

FIG. 5 is a simplified block diagram showing the design time 500 and runtime 502 of this other (order placement) exemplary embodiment. This figure shows how event data and event structure are related together at design time and at run time.

In particular, the order management system notifies the payment system after a customer has placed an order. The payment system sets the status of payment to open, and the payment due date (order date+14 days).

The event data are stored in an event structure 510 which has to be known at design time (during the implementation) of all the services that need to process that event at runtime.

The original event structure is depicted as the solid rectangle 510. This is recognized and published by the event description publisher 514. The event description publisher is a mechanism to recognize event structures, and publishes those at design time.

The dotted rectangle 516 is generated by the code generator 518. The code generator is a mechanism to generate code according to published event structure 519 managed in the central event catalog. Here the code generator is a plugin of the consumer.

At runtime, the Order Service and Payment Service are up and running. After receiving an order, the Order Service publishes an orderPlaced event on the event bus.

The orderPlaced event includes a payload 520 of event data. As depicted in the diagram shown in FIG. 5, this payload includes:
customerID: 1234
amount: 100
currency: USD
orderDate: Feb. 15, 2021

The Payment Service receives the orderPlaced event in terms of event data (the payload). Based on the data provided in the payload, it processes the logic as follows and also depicted in the diagram.
1. Processing the incoming event for customer 1234
2. Set the status of the payment "open"
3. Set the payment due date on Mar. 31, 2021.
This happens at runtime of the entire application.

FIG. 6A shows code of an exemplary implementation of the publisher component. This example is coded in the JAVA language using Spring Boot framework.

Here, the Order Service has implemented the original event having the unique name "com.sap.eventcatalog.event.OrderPlacedEvent". And according to this exemplary embodiment, the structure of this event "com.sap.eventcatalog.event.OrderPlacedEvent" is be published to the central instance of the Central Event Catalog.

In order to tell the event description publisher to automatically scan the event class, the annotation: "@EnableEventCatalog" is used. This annotation allows specifying packages. Only those packages will be scanned.

Based on the presence of the annotation, the event description publisher will scan event classes and publish to the central instance.

FIG. 6B shows a code snippet of the event class. The event description publisher is able to know which classes are event classes, by marking the event class with the "@EnableEventDescription".

The version attribute of the annotation allows versioning of the event. The annotation "@EventDescription" is optional. That annotation provides the capability to describe the attribute of the event structure, and can be used for documentation purposes.

Details regarding code generation are now described. In this particular example, the code generation is implemented as a MAVEN plugin. FIG. 7 shows code for the plugin.

This plugin is declared in the pom.xml (MAVEN). The plugin uses the following configuration:
information (host and port) about the central instance of the Central Event Catalog;
which events will be generated.

The output of the code generation is the Java source file of the event class implemented in the same way as on the producer side.

It may be difficult to generate the event class exactly as implemented on the producer side, due to specific implementation and format of the event class. Therefore the event description publisher also scans and publishes the source code of the event class as part of the event description in the field source.

The code generation will also retrieve (among others) the source code from the central instance. The code generation will then create an implementation source file containing the retrieved source code.

Figure 8:
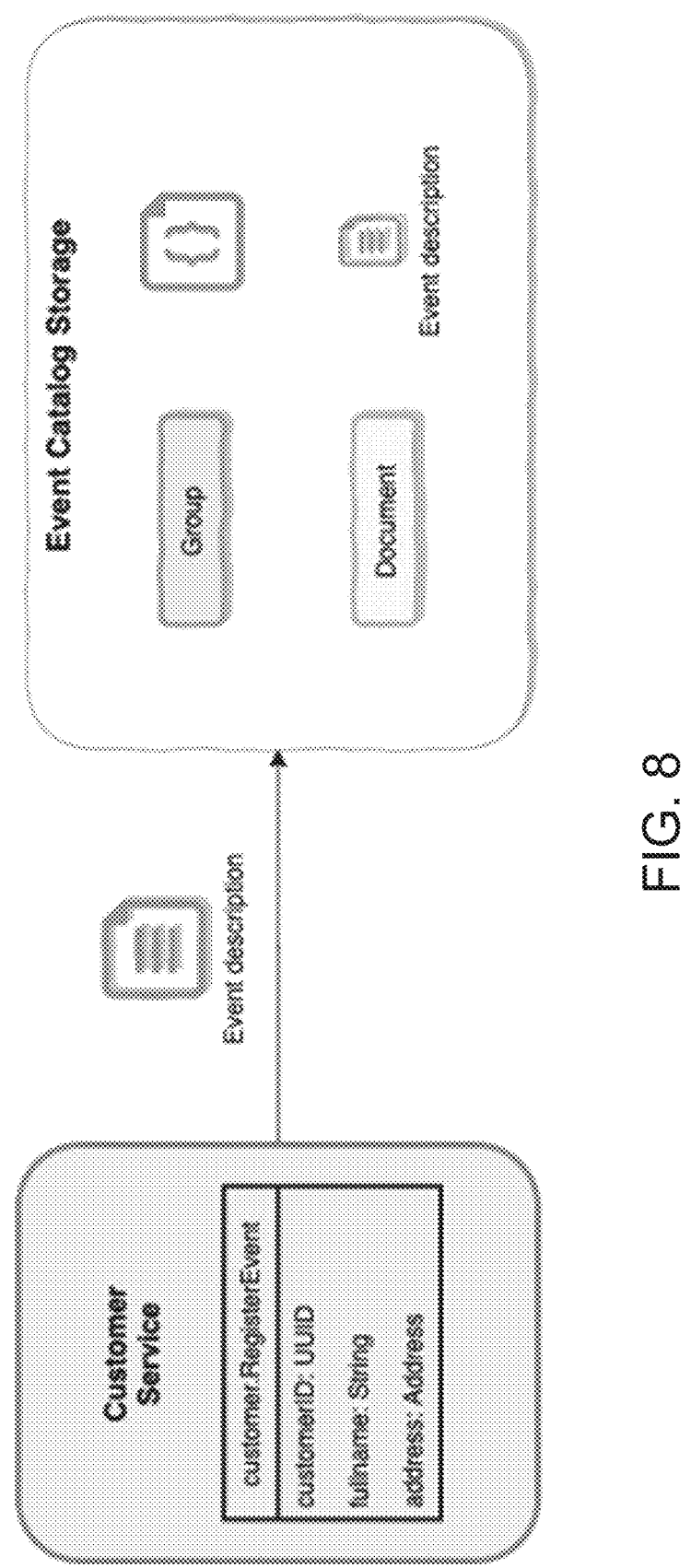
FIG. 8 is a simplified block diagram illustrating event description persistence.

FIG. 8 is a simplified block diagram illustrating persistence of the new customer registration event, as a central instance by the Central Event Catalog. In the event catalog, the entity which captures the structure and description of an event, is referred to as an event description document.

The event description publisher extracts the event class. The event description publisher publishes the event class as part of an event description document to the central instance.

In this particular example, the central instance persists the event description document within a document-based storage schema. The event description is persisted as a document within a container—here known as a group.

FIG. 9 shows a simplified block diagram illustrating an event description versioning capability according to an exemplary embodiment. The event catalog supports versioning of an event description. Thus, an event can be published as several versions.

The annotation: "@EnableEventDescription" allows specifying the version of the event class. The central instance persists each version of the event description as a document.

In FIG. 9, there are n versions of the event description. Using the annotation capability to provide versioning, the event consumer can specify in the configuration, which version of the event the code generation is going to generate the source file.

To illustrate what to the internal structure of the event description looks like, in this particular exemplary embodiment MongoDB is chosen as the underlying document-based technology. FIG. 10 is a simplified block diagram illustrating the implementation of an event description in MongoDB. Within MongoDB, the document container labeled as a "Group" in FIGS. 8-9, is instead referred to as a "Collection".

FIG. 11 shows an exemplary event description document 1100 in MongoDB.

According to this particular exemplary embodiment, the internal structure of the event description document is defined as follows:
- id 1102: unique identification of the event description document
- a unique event name 1104: the name of the event class
- version 1106: version of the event description
- source 1108: source code of the implemented event class
- A list of fields 1110 describe attributes of the implemented class with following information:
  - type 1112: data type of the attribute
  - name 1114: name of the attribute
  - description 1116: description of the attribute defined in the annotation @EventDescription.

An access modifier field can specify privacy of the attributes.

Returning now to FIG. 1, while that figure describes the event description as a document, this is not required. The event description could take the form of other than a formal document having a particular structure that is recognized by a document-type database schema (e.g., MongoDB).

Moreover, while FIG. 1 shows the publication engine as being outside of the non-transitory computer readable storage medium containing the event description document, this is not required. Particular embodiments could leverage the powerful processing engine of an in-memory database (e.g., the SAP HANA in-memory database) in order to perform one or more actions as have been described herein.

Figure 12:
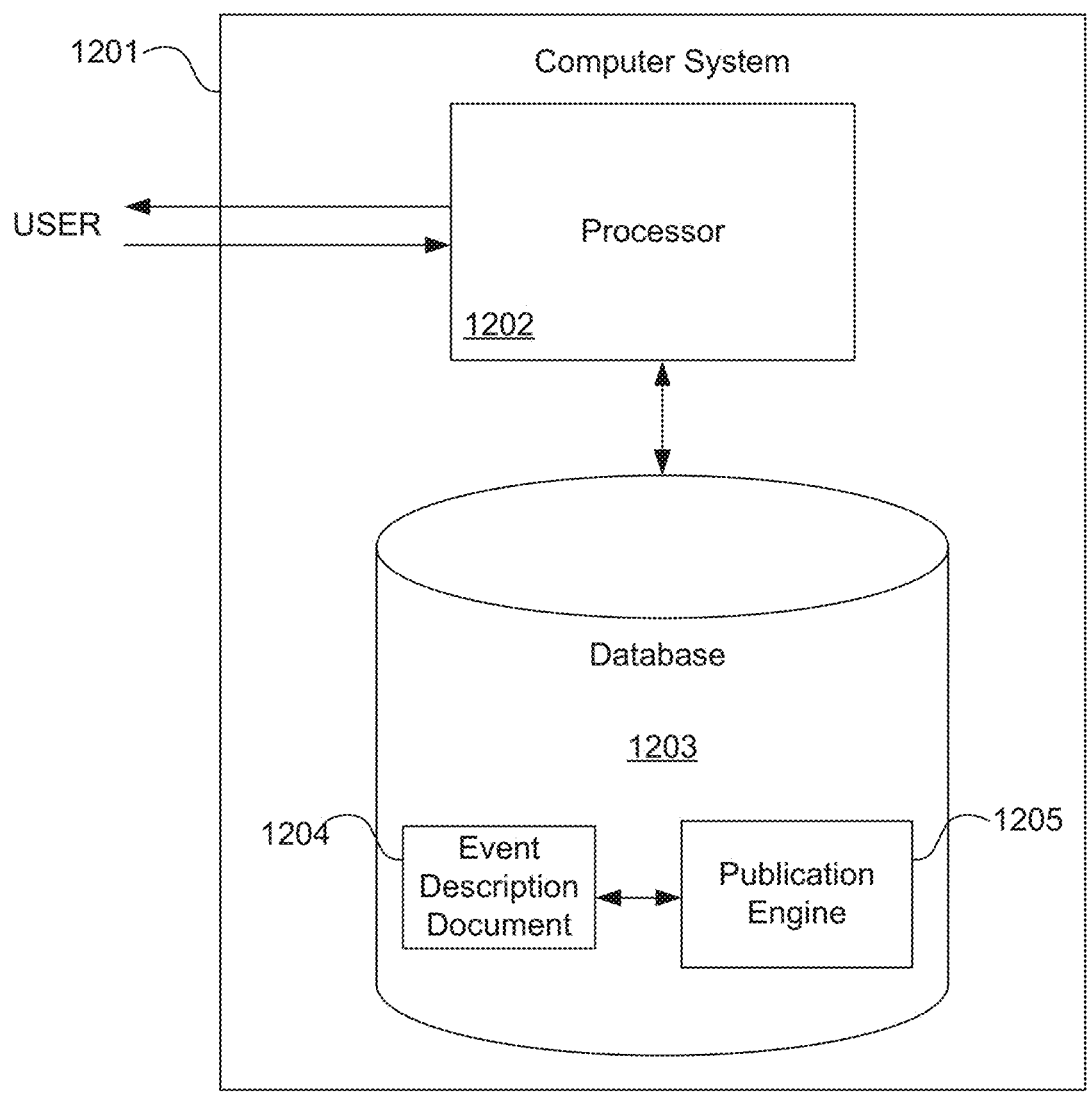
FIG. 12 illustrates hardware of a special purpose computing machine according to an embodiment that is configured to implement a central event catalog.

FIG. 12 illustrates hardware of a special purpose computing machine configured to perform as a central event catalog according to an embodiment. In particular, computer system 1201 comprises a processor 1202 that is in electronic communication with a non-transitory computer-readable storage medium comprising a database 1203. This computer-readable storage medium has stored thereon code 1205 corresponding to a publication engine. Code 1204 corresponds to an event description document. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 13:
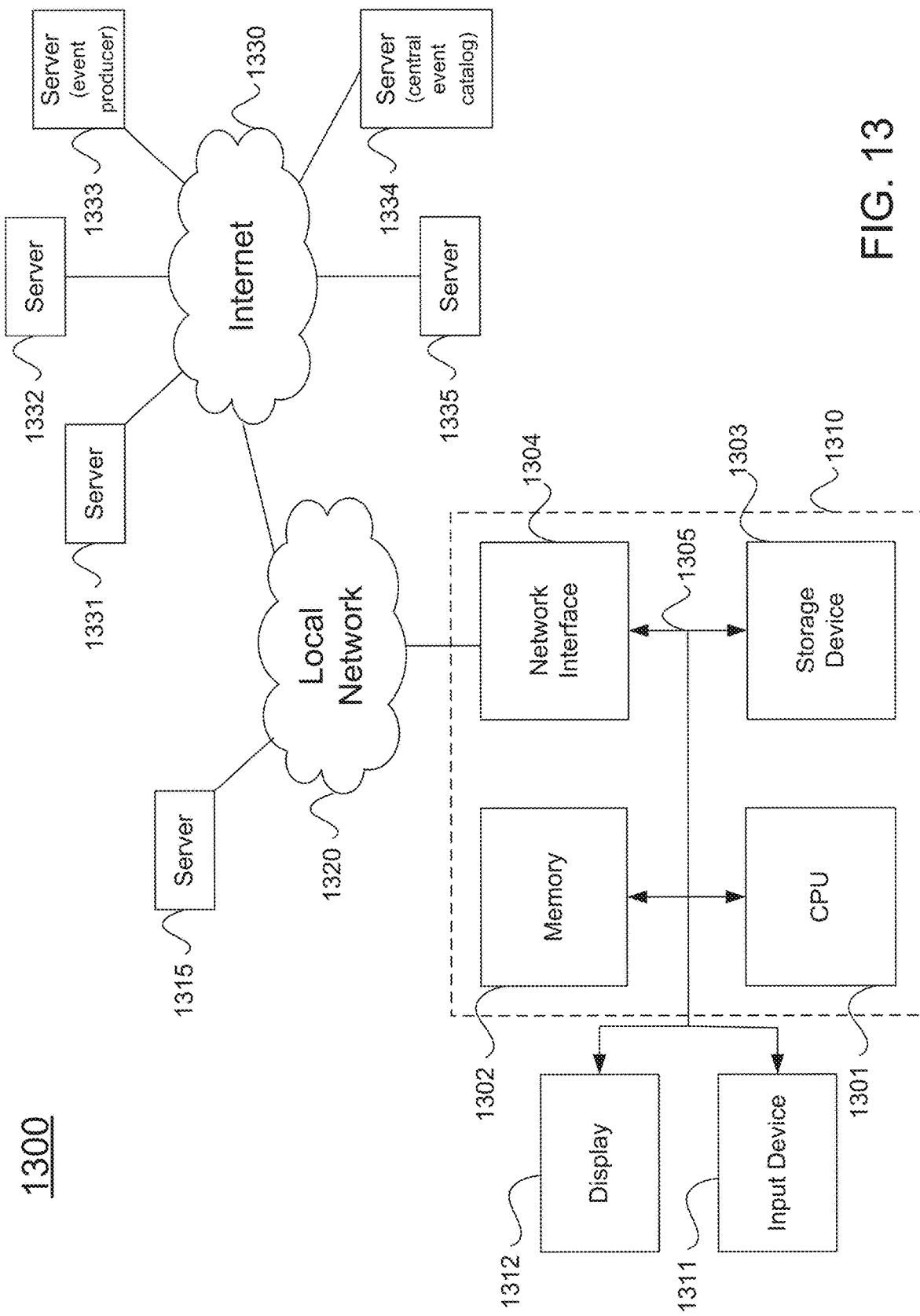
FIG. 13 illustrates an example computer system.

An example computer system 1300 is illustrated in FIG. 13. Computer system 1310 includes a bus 1305 or other communication mechanism for communicating information, and a processor 1301 coupled with bus 1305 for processing information. Computer system 1310 also includes a memory 1302 coupled to bus 1305 for storing information and instructions to be executed by processor 1301, including information and instructions for performing the techniques described above, for example. This memory may also be used for storing variables or other intermediate information during execution of instructions to be executed by processor 1301. Possible implementations of this memory may be, but are not limited to, random access memory (RAM), read only memory (ROM), or both. A storage device 1303 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1303 may include source code, binary code, or software files for performing the techniques above, for example. Storage device and memory are both examples of computer readable mediums.

Computer system 1310 may be coupled via bus 1305 to a display 1312, such as a Light Emitting Diode (LED) or liquid crystal display (LCD), for displaying information to a computer user. An input device 1311 such as a keyboard and/or mouse is coupled to bus 1305 for communicating information and command selections from the user to processor 1301. The combination of these components allows the user to communicate with the system. In some systems, bus 1305 may be divided into multiple specialized buses.

Computer system 1310 also includes a network interface 1304 coupled with bus 1305. Network interface 1304 may provide two-way data communication between computer system 1310 and the local network 1320. The network interface 1304 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1304 sends and receives electrical, electromagnetic, or optical signals that carry digital data streams representing various types of information.

Computer system 1310 can send and receive information, including messages or other interface actions, through the network interface 1304 across a local network 1320, an Intranet, or the Internet 1330. For a local network, computer system 1310 may communicate with a plurality of other computer machines, such as server 1315. Accordingly, computer system 1310 and server computer systems represented by server 1315 may form a cloud computing network, which may be programmed with processes described herein. In the Internet example, software components or services may reside on multiple different computer systems 1310 or servers 1331-1335 across the network. The processes described above may be implemented on one or more servers, for example. A server 1331 may transmit actions or messages from one component, through Internet 1330, local network 1320, and network interface 1604 to a component on computer system 1310. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
an event producer scanning a first non-transitory computer readable storage medium to obtain an original event structure of an event comprising an event name;
the event producer extracting from the original event structure, source code of an event class;
the event producer creating an event description including the original event structure, the source code, and an annotation, wherein the annotation includes at least two of:
a version attribute indicating a version of the event;
an event description marker marking the event class; and
an event description being for documentation purposes;
the event producer storing the event description in a first database of the first non-transitory computer readable storage medium according to a database schema; and
the event producer communicating the event description to a central event catalog for storage in a second non-transitory computer readable storage medium as a central instance, wherein after the communicating, the central instance is accessible to an event consumer to reconstruct the original event structure.

2. A method as in claim 1 wherein:
the event description comprises a document; and
the database schema comprises a document database schema.

3. A method as in claim 2 wherein:
the second non-transitory computer readable storage medium comprises a second database having the document database schema.

4. A method as in claim 1 wherein the event description includes a list of fields describing attributes of the event class.

5. A method as in claim 1 wherein:
the first non-transitory computer readable storage medium comprises an in-memory database; and
an in-memory database engine of the in-memory database performs the extracting.

6. A method as in claim 1 wherein:
the source code is configured to be compiled by the event consumer to reconstruct the original event structure.

7. A method as in claim 1 further comprising:
subsequent to the communicating, the event producer broadcasting the event including the event name over an event channel for receipt by the event consumer.

8. The method of claim 1, wherein the central instance is accessible to the event consumer to reconstruct the original event structure for executing a microservice at runtime.

9. The method of claim 1, wherein the central event catalog is configured to publish several versions of the event description, and wherein the central instance persists each version of the event description.

10. The method of claim 1, wherein during design time the original event structure is communicated to all microservices that process the event structure.

11. A method comprising:
an event consumer generating a query including a name of an event;
the event consumer posing the query to a first non-transitory computer readable storage medium storing an event description in a first database according to a database schema, the event description including the name, source code of an event class, and an annotation, wherein the annotation includes at least two of:
a version attribute indicating a version of the event;
an event description marker marking the event class; and
an event description being for documentation purposes;
the event consumer receiving the event description in response to the query; and
the event consumer compiling the source code to recreate an event structure of the event;
wherein prior to generating the query, the event structure was originally stored in a second non-transitory computer readable storage medium by an event producer responsible for creating the event description.

12. A method as in claim 11 wherein:
the event description comprises a document; and
the database schema comprises a document database schema.

13. A method as in claim 11 wherein the event description includes a list of fields describing attributes of the event class.

14. A method as in claim 11 further comprising:
subsequent to the compiling, the event consumer receiving the event including the name, broadcast by the event producer over an event channel; and
the event consumer processing the event according to the event structure.

15. A computer system comprising:
one or more processors;
a software program, executable on said computer system, the software program configured to cause an in-memory database engine of an in-memory database to:
scan a first non-transitory computer readable storage medium to obtain an original event structure of an event comprising an event name;
extract from the original event structure, source code of an event class;
create an event description including the original event structure, the source code, and an annotation, wherein the annotation includes at least two of:
a version attribute indicating a version of the event;
an event description marker marking the event class; and
an event description being for documentation purposes;
store the event description in a first database of the first non-transitory computer readable storage medium according to a database schema; and
communicate the event description to a central event catalog for storage in a second non-transitory computer readable storage medium as a central instance.

16. A computer system as in claim 15 wherein:
the event description comprises a document; and
the database schema comprises a document database schema.

17. A computer system as in claim 16 wherein:
the second non-transitory computer readable storage medium comprises a second database having the document database schema.

18. A computer system as in claim 15 wherein the event description document includes a list of fields describing attributes of the event class.

19. A computer system as in claim 15 wherein during design time the source code is configured to be compiled by an event consumer to reconstruct the original event structure.

20. A computer system as in claim 15 further comprising:
subsequent to the communicating, the in-memory database engine broadcasting the event including the event name over an event channel.

* * * * *